(12) United States Patent
Milford

(10) Patent No.: US 9,606,612 B2
(45) Date of Patent: Mar. 28, 2017

(54) AUGMENTED REALITY PROXIMITY SENSING

(75) Inventor: Peter N. Milford, Los Gatos, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 502 days.

(21) Appl. No.: 13/148,167

(22) PCT Filed: Jul. 20, 2010

(86) PCT No.: PCT/US2010/042532
§ 371 (c)(1),
(2), (4) Date: Aug. 5, 2011

(87) PCT Pub. No.: WO2012/011893
PCT Pub. Date: Jan. 26, 2012

(65) Prior Publication Data
US 2012/0056847 A1  Mar. 8, 2012

(51) Int. Cl.
*G06F 1/32* (2006.01)
*G02B 27/01* (2006.01)

(52) U.S. Cl.
CPC ......... *G06F 1/3265* (2013.01); *G02B 27/017* (2013.01); *G06F 1/3231* (2013.01); *G02B 2027/014* (2013.01); *G02B 2027/0178* (2013.01); *G02B 2027/0187* (2013.01); *G09G 2330/021* (2013.01); *G09G 2380/02* (2013.01); *Y02B 60/1242* (2013.01); *Y02B 60/1289* (2013.01)

(58) Field of Classification Search
CPC ......... G06F 3/011–3/015; G06F 3/044; G02B 27/0093; H03K 17/962; H03K 17/955
USPC ......... 345/156, 173, 174
See application file for complete search history.

(56) References Cited

U.S. PATENT DOCUMENTS

| 5,506,730 A | 4/1996 | Morley et al. |
| 5,802,479 A | 9/1998 | Kithil et al. |
| 5,969,698 A | 10/1999 | Richard et al. |

(Continued)

FOREIGN PATENT DOCUMENTS

| CN | 101496400 A | 7/2009 |
| CN | 101720551 A | 6/2010 |

(Continued)

OTHER PUBLICATIONS

Rosler, Augmented Reality Games on the iPhone, Bachelor Thesis; Blekinge Institute of Technology; Spring 2009.

(Continued)

*Primary Examiner* — William Boddie
*Assistant Examiner* — Jeffrey A Parker
(74) *Attorney, Agent, or Firm* — Turk IP Law, LLC

(57) ABSTRACT

Technologies are generally described for employing proximity sensing mechanisms in augmented reality (AR) systems. Sensors strategically placed on AR eyeglasses in locations such as right and/or left arms, bridge, or flip-up feature of the eyeglasses may be used to detect AR eyeglass usage for power management and/or to provide user interface elements like volume control, display controls, user input, and comparable ones. According to some examples, the sensors may be mechanical sensors, capacitive sensors, optical sensors, inductive sensors, magnetic sensors, and/or similar components.

18 Claims, 10 Drawing Sheets

(56) References Cited

U.S. PATENT DOCUMENTS

| | | | |
|---|---|---|---|
| 6,275,146 | B1 | 8/2001 | Kithil et al. |
| 6,349,001 | B1 | 2/2002 | Spitzer |
| 7,143,648 | B2 | 12/2006 | Pristup |
| 7,375,701 | B2 | 5/2008 | Covannon et al. |
| 7,375,728 | B2 | 5/2008 | Donath et al. |
| 7,407,029 | B2 | 8/2008 | Breed et al. |
| 7,415,126 | B2 | 8/2008 | Breed et al. |
| 7,439,940 | B1 | 10/2008 | Maguire, Jr. |
| 7,487,118 | B2 | 2/2009 | Crutchfield, Jr. et al. |
| 7,518,501 | B2 | 4/2009 | Huston |
| 7,599,762 | B2 | 10/2009 | Discenzo et al. |
| 7,627,085 | B2 | 12/2009 | Boyden et al. |
| 7,660,437 | B2 | 2/2010 | Breed |
| 7,663,502 | B2 | 2/2010 | Breed |
| 2005/0275637 | A1* | 12/2005 | Hinckley et al. ............ 345/173 |
| 2006/0197832 | A1 | 9/2006 | Yamada et al. |
| 2007/0109274 | A1* | 5/2007 | Reynolds ................ G06F 3/041 345/173 |
| 2008/0150905 | A1* | 6/2008 | Grivna et al. ................ 345/173 |
| 2008/0266323 | A1* | 10/2008 | Biocca et al. ................ 345/633 |
| 2009/0009588 | A1* | 1/2009 | Shaffer et al. ............ 348/14.08 |
| 2009/0033588 | A1 | 2/2009 | Kajita et al. |
| 2009/0059159 | A1* | 3/2009 | Howell et al. .................. 351/41 |
| 2009/0073084 | A1 | 3/2009 | Mullen |
| 2009/0243966 | A1* | 10/2009 | Kato et al. ........................ 345/8 |
| 2010/0039380 | A1 | 2/2010 | Lanier |
| 2010/0091031 | A1 | 4/2010 | Tsujimoto |
| 2011/0175932 | A1* | 7/2011 | Yu et al. ....................... 345/661 |
| 2012/0044188 | A1* | 2/2012 | Prendergast et al. ......... 345/174 |
| 2013/0118255 | A1* | 5/2013 | Callsen et al. .................. 73/491 |

FOREIGN PATENT DOCUMENTS

| | | | |
|---|---|---|---|
| JP | 11064780 | A | 3/1999 |
| JP | 2003076353 | A | 3/2003 |
| JP | 2006205930 | A | 8/2006 |
| JP | 2009130494 | A | 6/2009 |

OTHER PUBLICATIONS

International Search Report and Written Opinion mailed Jun. 20, 2011 in PCT/US10/42532.
Peternier et al., "Chloe@University: An indoors, HMD-based mobile mixed reality guide." ACM symposium on Virtual reality software and technology, Newport Beach, California, Nov. 5-7, 2007.
"AVR® 8-Bit RISC—Touch Technology," accessed at http://web.archive.org/web/20080919143110/http://www.atmel.com/products/AVR/default_touch.asp, accessed on Nov. 18, 2014, pp. 1-2.
"Bluetooth MP3 Player Sunglasses—2GB Flash Memory," accessed at https://www.chinavasion.com/china/wholesale/Dumping_ground_defunct_subcats/MP3_Player_Sunglasses/Bluetooth_MP3_Player_Sunglasses-2GB_Flash_Memory, accessed on Nov. 18, 2014, pp. 1-5.
"Body capacitance," accessed at http://web.archive.org/web/20100805042400/http://en.wikidpedia.org/wiki/Body_capacitance, last modified on Jun. 1, 2010, p. 1.
"Fifth Dimension Technologies Virtual Reality for the Real World! sm," accessed at https://web.archive.org/web/20090301073344/http://5dt.com/products/phmd.html, accessed on Nov. 24, 2014, pp. 1-2.
"HMD 800 Series," accessed at http://www.est-kl.com/index.php?id=159, accessed on Nov. 18, 2014, pp. 1-3.
"Input Controllers," accessed at http://web.archive.org/web/20081203151435/http://www.ireality.com/inputcontrols.html, accessed on Nov. 18, 2014, p. 1.
"Integrated Device Technology—Semiconductor Solutions—Touch products," accessed at https://web.archive.org/web/20100715164525/http://www.idt.com/?catID=18694340&loc=col1&bHt=600, accessed on Nov. 24, 2014, pp. 1-2.
"Motorola is a global communications leader powered by a passion to invent and an unceasing commitment to advancingthe way the world connects," accessed at http://web.archive.org/web/20100531043445/http://www.motorola.com/staticfiles/Business/Corporate/US-EN/about-motorola/about-motorola-home.html?globalObjectId=1708, accessed on Nov. 18, 2014, p. 1.
"Wireless Eyewear TV/Head Mounted Display/Wireless Video Glasses," accessed at http://www.alibaba.com/product-detail/Wireless-Eyewear-TV-Head-Mounted-Display_212677475.html, accessed on Nov. 18, 2014, pp. 1-2.
Anastasi, V., "Stereo Viewing Monitor Display for Endoscopic Visualization," Vista ORPC with InfomatixTM IntraOp Software, pp. 1-5 (Apr. 1999).
Harris, M., "Brando USB Sunglasses MP3 Player," accessed at http://web.archive.org/web/20110425204956/http://techgage.com/article/brando_usb_sunglasses_mp3_player, published on May 26, 2006, pp. 1-4.

\* cited by examiner

AUGMENTED REALITY PROXIMITY SENSING

CROSS-REFERENCE TO RELATED APPLICATION

This Application is the U.S. National Stage filing under 35 U.S.C §371 of PCT Application Ser. No. PCT/US2010/042532 filed on Jul. 20, 2010. The PCT Application is herein incorporated by reference in its entirety.

BACKGROUND

Unless otherwise indicated herein, the materials described in this section are not prior art to the claims in this application and are not admitted to be prior art by inclusion in this section.

Augmented reality (AR) refers to a view of a physical (real) world environment whose elements are augmented by virtual, typically computer-generated, imagery, thereby creating a mixed reality. The augmentation may be conventionally in real time and in context with environmental elements, such a sporting event, a military exercise, a game, etc. AR technology enables the information about surrounding real world of a person to become interactive and digitally usable by adding object recognition and image generation. Artificial information about the environment and the objects may be stored and retrieved as an information layer separate from a real world view layer.

The present disclosure appreciates that there are several limitations with AR systems. In displaying augmented reality images (still or video) to a user, some AR systems utilize AR eyeglasses. While providing a realistic experience to the user, display devices in eyeglass format present several challenges such as power management and/or limitation in providing the user with user interface elements to interact with the AR system. Due to size limitations, power availability and efficient use of available power may be design concerns. Furthermore, providing interaction tools such as volume control, display controls, and comparable ones may be a challenge due to size and shape of eyeglass format displays.

SUMMARY

The present disclosure describes a system configured to adaptively power a wearable augmented reality (AR) display based on proximity sensors. Some example systems may include a sensor attached to the wearable AR display and/or a processor coupled to the sensor. The sensor is configured to generate a detection signal, where the detection signal indicates one or more of a presence of a wearer's head, a position of the wearer's head, and/or a status of the wearable AR display. The processor is configured to determine whether the wearable AR display is to be powered up based on the detection signal from the sensor, and power up the wearable AR display when the wearable AR display is to be powered up.

The present disclosure also describes another system configured to adaptively power a wearable AR display based on proximity sensors. Some examples of other systems may include a capacitive sensor coupled to a reference node and/or a voltage measuring device 446 coupled to the sensor. The sensor is configured to measure a value difference in capacitance between a reference node and an external node. The voltage measuring device is configured to receive the value difference as input, and is further configured to provide data output that is configured to make a determination when to provide power to the wearable AR display.

The present disclosure further describes a method for controlling operational aspects of a wearable AR through proximity sensors. The method includes receiving a sense signal from at least one of a plurality of sensors attached to one or more of a left arm, a right arm, a bridge, and/or a rim of the wearable AR display. The method also includes determining one or more of a presence of a wearer's head, a position of the wearer's head, a user input, and/or a status of the wearable AR display based on the received sense signal. The method further includes performing an action associated with an operational aspect of the wearable AR display in response to the determination.

The present disclosure further describes a computer-readable storage medium having instructions stored thereon for controlling operational aspects of a wearable AR display through proximity sensors. The instructions stored on the computer-readable storage medium may include sensing one or more of a presence of a wearer's head, a position of the wearer's head, a user input, and/or a status of the wearable AR display at a plurality of sensors attached to the wearable AR display. The sensing may be accomplished based on a received sense signal. The instructions may also include determining whether to power up or power down the wearable AR display based on one or more of the sensed presence of the wearer's head and/or the status of the wearable AR display. Yet another set of instructions may include inferring a user response based on the sensed position of the wearer's head. The instruction may further include determining an action associated with an operational aspect of the wearable AR display in response to one of the inferred user response or sensed user input. The determining whether to power up or down, inferring the user response, and determining an action instructions may be performed at a processor.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
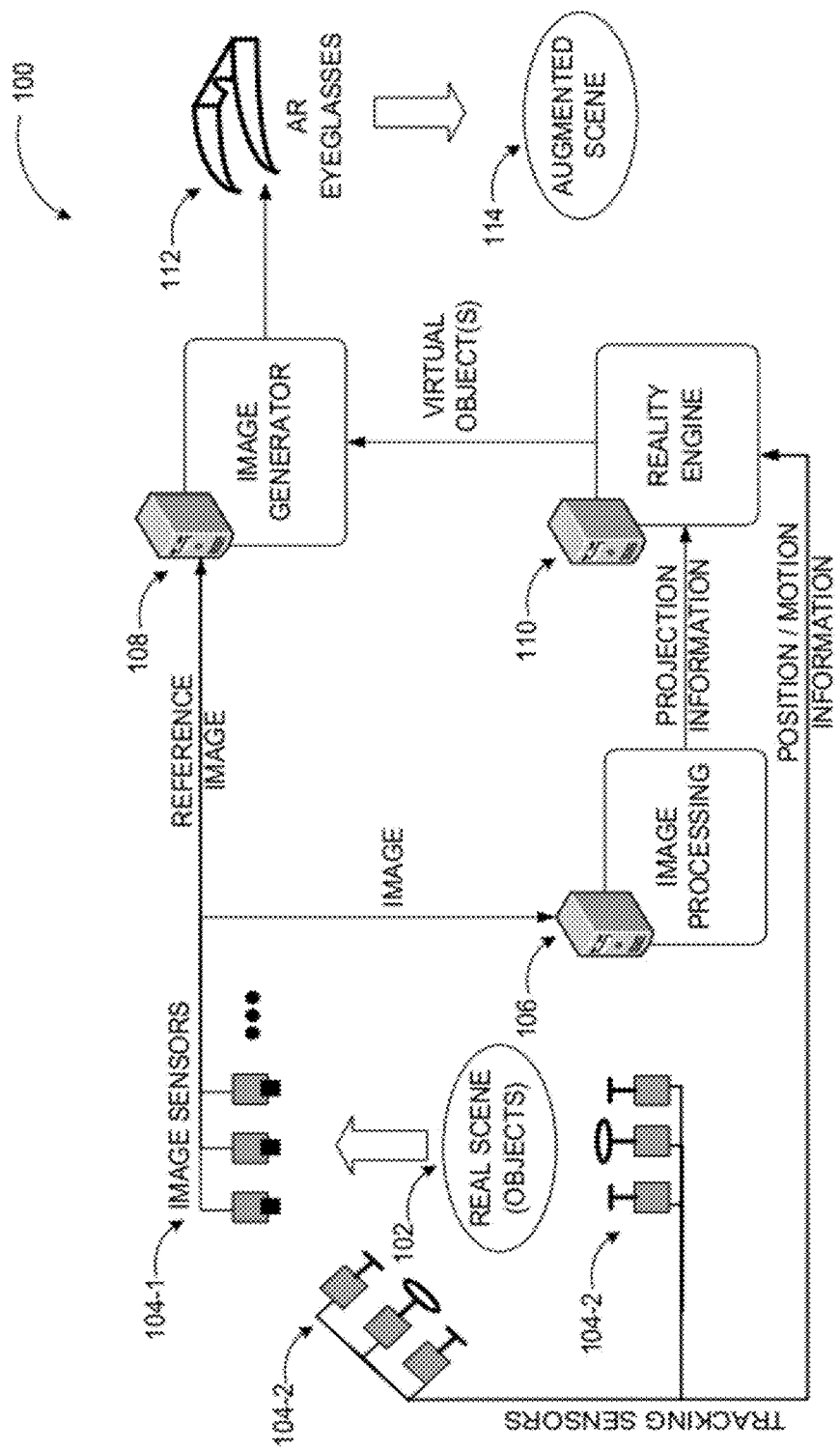
FIG. 1 illustrates an example Augmented Reality (AR) system, where AR eyeglasses may be used to display an augmented scene to a user.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to an employing proximity sensing mechanisms in augmented reality systems for power management and user interface elements.

Briefly stated, proximity sensing mechanisms may be employed in augmented reality (AR) systems. Sensors strategically placed on AR eyeglasses in locations such as right and/or left arms, bridge, or flip-up feature of the eyeglasses may be used to detect AR eyeglass usage for power management and/or to provide user interface elements like volume control, display controls, user input, and comparable ones. According to some examples, the sensors may be mechanical sensors, capacitive sensors, optical sensors, inductive sensors, magnetic sensors, and/or similar components.

FIG. 1 illustrates an example Augmented Reality (AR) system 100, where AR eyeglasses may be used to display an augmented scene to a user. AR explores the application of computer-generated imagery in live video streams to expand the real world presentation. Example AR systems arranged in accordance with the present disclosure may be in controlled environments containing a number of sensors and actuators, may include one or more computing device adapted to process real and computer-generated imagery, and may include visualization systems such as head-mounted displays (or "AR eyeglasses"), virtual retinal displays, monitor or similar regular displays, and comparable devices.

Example AR system 100 includes image sensors 104-1 for capturing live images of real scene (objects) 102, as well as tracking sensors 104-2 for tracking a position and/or a motion of the objects. Image sensors 104-1 may be digital cameras, webcams, or some other image capturing devices. Tracking sensors 104-2 may include a number of receiving devices arranged in a passive sensing network to enhance tracking performance through frequency, bandwidth, and spatial diversity of the network. The receiving devices (e.g., one or more RF receivers) may be adapted to utilize communication signals (e.g., electromagnetic waves such as RF signals) from nearby signal sources such as communication towers (e.g., cellular telephony communication towers) or communication base stations. Tracking sensors 104-2 may be located in different positions and may be communicatively coupled to a centralized or distributed computing system to form the collaborative network.

The captured image(s) may be provided to an image processing sub-system 106, which may be adapted to perform one or more of digitization of images into digital images, receipt of digital images, and/or processing digital images. Processing of digital images may include one or more of determining locations of feature points in the images, computation of affine projections, tracking of edges, filtering, and/or similar operations. Image processing sub-system 106 may be configured to provide projection information, such as one or more of the results of the above described operations, to reality engine 110. Tracking sensors 104-2 may be configured to provide position and/or motion information associated with objects of interest in real scene 102 to reality engine 110. Reality engine 110 may be adapted to execute a graphics process to render scenes based on the captured images that incorporates position and/or motion information from tracking sensors 104-2.

Image generator 108 may be adapted to receive reference image(s) from image sensors 104-1 as well as image data associated with virtual object(s), and may be adapted to overlay the captured real scene images with the image data associated with the virtual object(s) to provide an augmented scene 114. AR eyeglasses 112 are one example visualization mechanism that may be utilized in AR system 100. AR eyeglasses 112 may be implemented as single (mono) or stereo display. AR eyeglasses function essentially as a portable computer display. They may be see-through or non see-through (i.e. video cameras providing real world data). AR eyeglasses may also include virtual reality goggles and similar implementations. The term AR eyeglasses as used herein refer to any head wearable computer display including virtual reality displays and helmet style displays. The terms wearable AR display and AR eyeglasses are used interchangeably throughout this disclosure. While providing a realistic experience to a user, AR eyeglasses 112 may present challenges in power management and providing user interface elements to the user. In a system according to at least some of the embodiments described herein, AR eyeglasses 112 may be fitted with strategically positioned sensors configured to detect usage and/or provide user interface elements as described in more detail below.

Processing for at least some of the components of AR system 100 such as image processing sub-system 106, reality engine 110, image generator 108, and/or AR eyeglasses 112 may be performed by separate applications, one or more integrated applications, one or more centralized services, or one or more distributed services on one or more computing devices. Each computing device may be either a general purpose computing devices or a special purpose computing device that may be a standalone computer, a networked computer system, a general purpose processing unit (e.g., a micro-processor, a micro-controller, a digital signal processor or DSP, etc.), or a special purpose processing unit. If executed on different computing devices, various components of the AR system 100 may be adapted to communicate over one or more networks.

Figure 2:
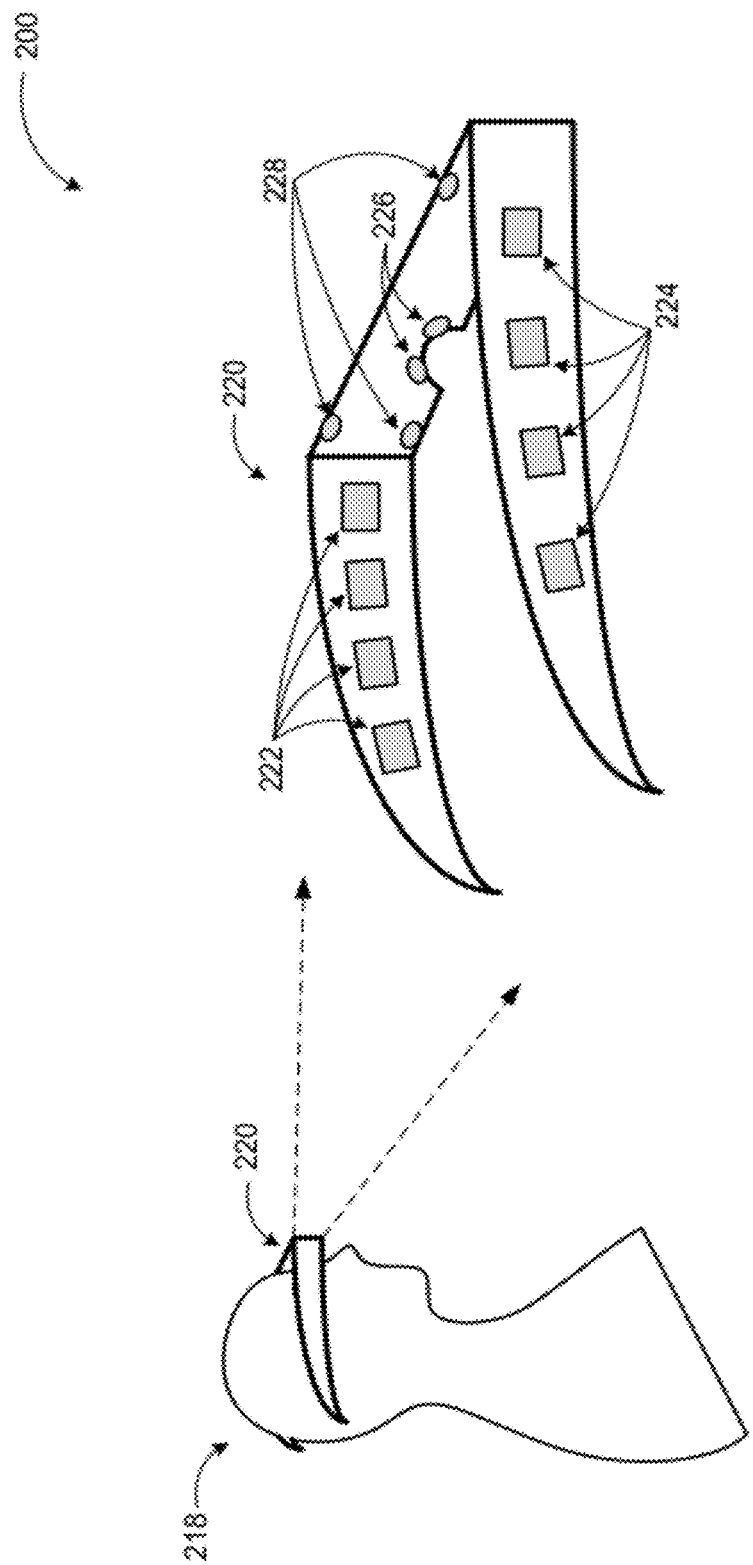
FIG. 2 illustrates example AR eyeglasses with proximity sensors on the arms and/or bridge of the eyeglasses.

FIG. 2 illustrates example AR eyeglasses with proximity sensors on the arms and/or bridge of the eyeglasses arranged in accordance with at least some embodiments. Proximity sensors may be placed in a variety of strategic locations such as along the arms, on the bridge, or along the rim of AR eyeglasses 220 as shown in diagram 200. The sensors may include capacitive sensors, inductive sensors, magnetic sensors, sonar sensors, optical sensors (photocell or laser), Eddy-current sensors, thermal infrared sensors, mechanical switches, and similar ones.

One or more of the sensors 222, 224, 226, and 228 may be used to assist power management for AR eyeglasses 220 by determining whether or not the glasses are in use through detection of a wearer's (user 218) head, nose, etc. Sensors 222, 224, 226, and 228 may also be utilized in providing a user 218 wearing the AR eyeglasses 220 with user interface elements for controlling various features of AR operations and receiving user feedback.

In a user interface application, the sensors may be configured to receive wearer input, via tapping or touching, regarding AR operation controls such as audio volume control, brightness display of the AR eyeglasses 220, turning on or off individual displays or the entire AR eyeglasses 220, and so on. In some examples, the sensors may be located on the outside arms of the AR eyeglasses 220 (e.g. 224) and configured so users can control operational parameter by tapping or touching the side of their AR eyeglasses 220 while wearing them. Conversely, the aforementioned sensors may be located on the inside arms of the AR eyeglasses 220 (e.g. 222) and configured for detecting if user 218 is wearing the AR eyeglasses 220 (whether the eyeglasses should be operational or in a non-operational state). This allows the sensors to be in close proximity to the skin of the wearer.

In another example, sensors 222, 224, 226, and/or 228 may be configured to sense an orientation of a wearer's head relative to his or her torso. For instance, one or more sensors at select position(s) in the AR eyeglasses 220 may be configured to measure the difference in capacitance between their reference capacitance (see FIG. 4 for more details) and a capacitance of the shoulder of the wearer. When user 218 wearing the AR eyeglasses 220 moves his or her head to the left or right, the difference in capacitance may change since the shoulder is farther away from the sensor(s) at the select position(s). Based on the determination of the capacitance difference, the AR system may be able to infer in which direction user 218 is looking relative to his or her torso. The inferred information may be used as user input according to some embodiments. For example, turning left-to-right followed by right-to-left may indicate "no", or up-and-down followed by down-and-up may indicate "yes", and so on.

Sensors 222, 224, 226, and 228 may also be utilized for reliable detection. For example, input from behind ear sensors and bridge sensors may be configured to detect the wearer's head and nose for a reliable determination that the AR eyeglasses 220 are actually being worn. This may prevent errors due to misreading by one or more of the sensors. Of course various sensors may be used for different functionalities as described herein.

Figure 3:
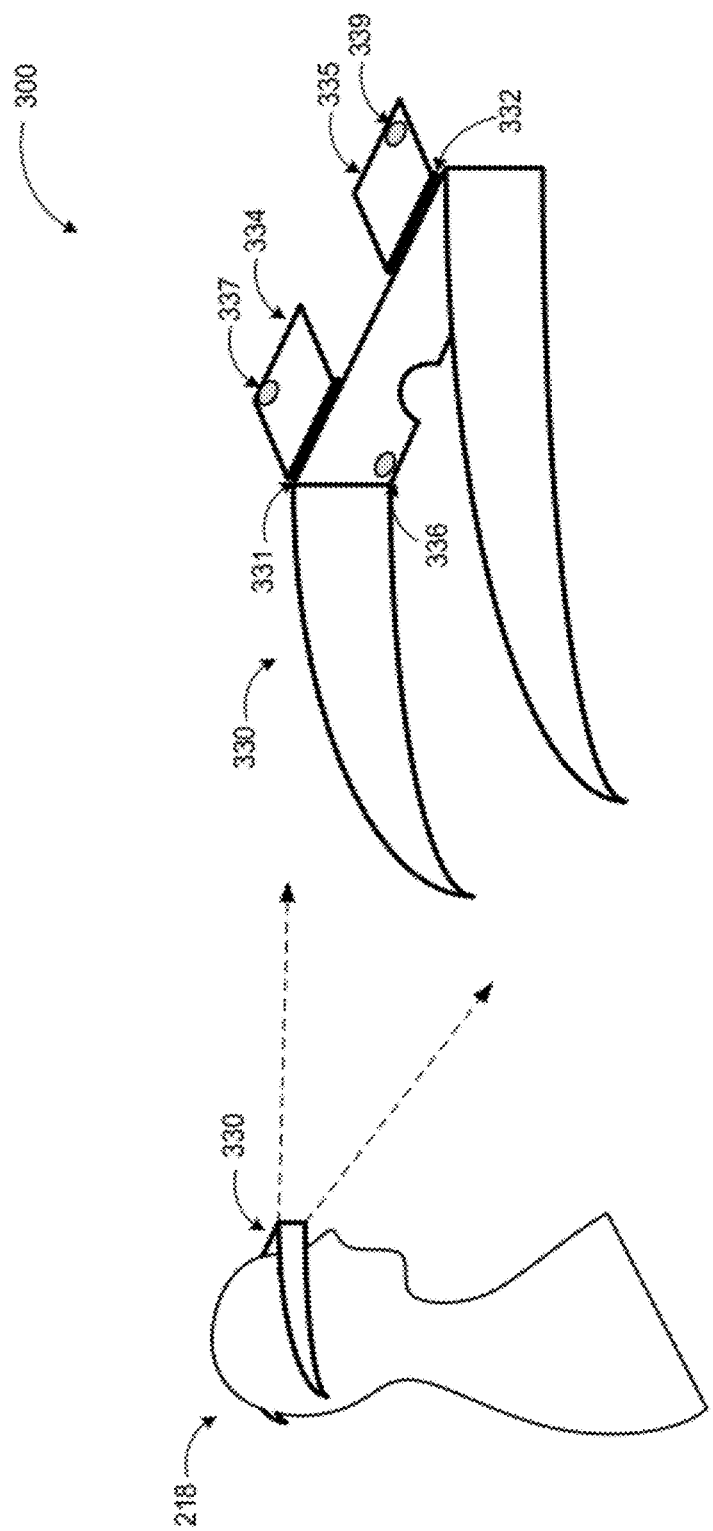
FIG. 3 illustrates further example AR eyeglasses with proximity sensors on a flip-up feature of the eyeglasses.

FIG. 3 illustrates further example AR eyeglasses with proximity sensors on a flip-up feature of the eyeglasses arranged in accordance with at least other embodiments. As mentioned above, sensors positioned in different locations of AR eyeglasses 330 in diagram 300 may be configured for use as user interface elements or control elements for automated controls of the AR eyeglasses.

Power management is one of the design considerations in AR headwear such as AR eyeglasses 330. Being a portable electronic device, AR eyeglasses 330 are bound to have limited power supply from a battery, solar power, or similar source. Thus, preventing waste of available power (e.g. turning off or transitioning into a sleep mode when not in use) for AR eyeglasses 330 may be beneficial. Some example approaches like detecting whether the glasses are being worn through capacitive sensors on the arms or bridge of the AR eyeglasses have been discussed above. In addition, other configurations may be employed to determine whether the glasses should be turned off (or transitioned into a low power mode) as shown in diagram 300.

AR eyeglasses 330 may be fitted with a flip-up feature, where the movable parts 334 and 335 may be a cover that is configured to indicate non-use in a closed position or they may be the actual displays that operate in a closed position. According to at least some embodiments, hinges 331 and 332 may be configured for use as mechanical switches turning the AR eyeglasses 330 on or off. According to other embodiments, sensors (e.g. capacitive, optical, or magnetic) 336, 337, and 339 may be configured to detect a position (closed or open) of the movable parts 334 and 335. The sensors may be used individually or in substantially overlapping pairs (e.g. sensors 336 and 337). Movable parts may include two parts as shown in diagram 300. Alternatively, a single movable part may be used to cover the AR eyeglasses 330 substantially.

Figure 4:
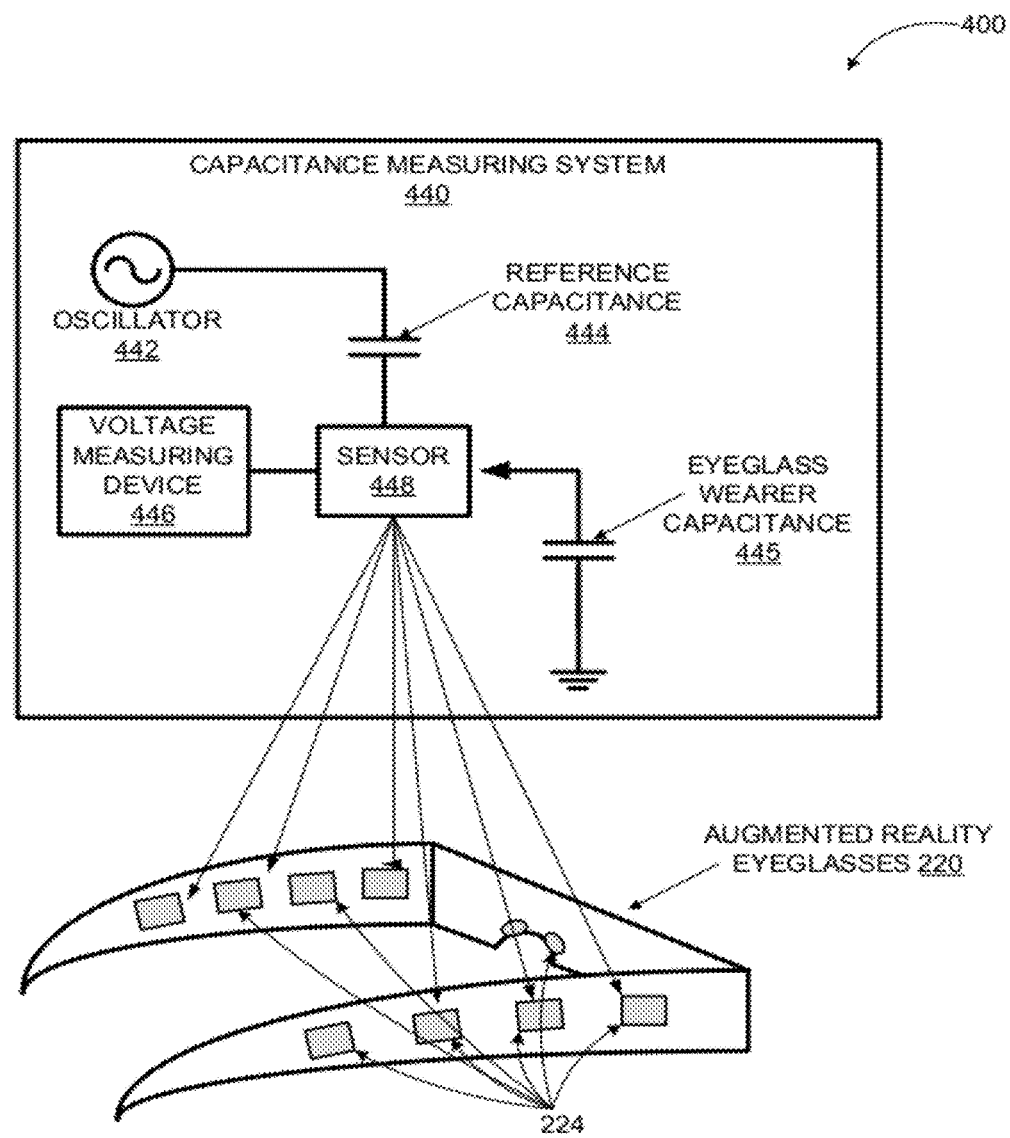
FIG. 4 illustrates a system configured to detect when AR eyeglasses are worn by individuals for power management purposes.

FIG. 4 illustrates a system configured to detect when AR eyeglasses are worn by individuals for power management purposes arranged in accordance with at least some of the embodiments. When such AR eyeglasses are being worn, they may be powered up; when they are not being worn, they may be powered off (or put into a power conservation state).

In some examples, a capacitance measuring system 440 of diagram 400 includes an oscillator 442, a sensor 448, a voltage measuring device 446, and a reference capacitance 444 that is referenced against the effective capacitance 445 of an AR eyeglass wearer. Capacitance measuring system 440 may be configured to power up the AR eyeglasses 220 when worn by the wearer; and also configured to power down the AR eyeglasses 220 when removed by the wearer. Alternatively, capacitance measuring system 440 may be configured to transition the AR eyeglasses 220 into a low-power sleep mode or power conservation state, thereby conserving valuable power in the portable AR eyeglasses 220.

Oscillator 442 may be adapted to provide power to the sensor 448 through reference capacitance 444. The sensor 448 may be configured to measure the capacitive difference between the reference capacitance 444 and the capacitance 445 of a wearer of the AR eyeglasses 220. The capacitive difference may be translated into a voltage by the sensor 448. Sensors detecting capacitive differences can be referred to as capacitive sensors, and can be constructed from various materials such as copper, Indium Tin Oxide (ITO), and similar materials. Size, spacing, and distance from ground plane are parameters taken into account when designing capacitive sensors.

The voltage measuring device 446 can be configured to measure a voltage generated by the sensor 448 in response to the capacitance difference between reference capacitance 444 and capacitance 445 of the AR eyeglass wearer. The voltage measuring device 446, may be utilized to evaluate the voltage measurement and make a determination of whether the AR eyeglasses 220 are worn by the wearer. Alternatively, voltage measuring device 446 may be configured to provide the voltage measurement to a processor of the AR system, which may then reach relevant conclusions and take action (e.g., adjust power state).

For example, the voltage measuring device 446 may be configured to measure a first voltage and forwards the measurement to the processor of the AR system, where the processor may be configured to access a look-up table (stored within or outside the system 440) to determine that the first voltage maps to the condition of "wearing glasses." Conversely, if voltage measuring device 446 measures a second voltage, the processor may be configured to determine from the look-up table that the second voltage maps to the condition of "not wearing glasses."

Thus, the voltage reading by the voltage measuring device 446 may be based on a capacitive difference reading by the sensor 448, and the capacitance difference reading is based on the difference between the reference capacitance 444 and the effective capacitance 445 of the wearer. If the wearer is wearing the AR eyeglasses 220, one kind of capacitive difference may be measured by the sensor 448; and, when the wearer is not wearing the AR eyeglasses 220, a different capacitive difference may be measured by the sensors. Details of how different sensors may determine capacitance differences are discussed below in conjunction with FIG. 6.

According to other embodiments, the system 440 as shown in diagram 400 may utilize multiple sensors 224 that can be electrically coupled to the oscillator 442. Each of these sensors may be associated with a corresponding voltage measuring device. In one example, sensors 224 may be placed at various locations on the AR eyeglasses 220, as is shown in FIG. 4. The locations for the sensors may include, but are not limited to, left and/or right arm of the eyeglasses, a bridge of the eyeglasses, etc. For example, the sensors 224 may be placed on the arms of the AR eyeglasses 220, such that they measure the capacitance behind the ear of a wearer. In another example, the sensors may be placed on the bridge of the AR eyeglasses 220, thereby, detecting whether the glasses are resting on the nose of the wearer (thus indicating the wearer is wearing the AR eyeglasses 220 and that the AR eyeglasses 220 should be powered up by the oscillator 442). In still another example, the sensors may be placed on the bridge or upper rim of the AR eyeglasses 220 in order to detect the presence or absence of a wearer's forehead.

Embodiments are not limited to capacitive sensors, and other kinds of proximity sensors such as inductive sensors, magnetic sensors, sonar sensors, optical sensors (photocell or laser), Eddy-current sensors, thermal infrared sensors, and similar ones may also be employed using the principles described herein. The different types of sensors, including the capacitive sensors discussed with reference to FIG. 4, may be utilized homogenously (i.e., all sensors of the same type on the AR eyeglasses 220) or heterogeneously (i.e., different kinds of sensors on the same AR eyeglasses 220).

According to further embodiments, a hydrophobic coating may be used to prevent water/sweat from interfering with the measurement and functionality of the sensor 448 or sensors 224. This coating may house at least a portion of the functionality the sensor and/or other parts of the system 440.

Figure 5:
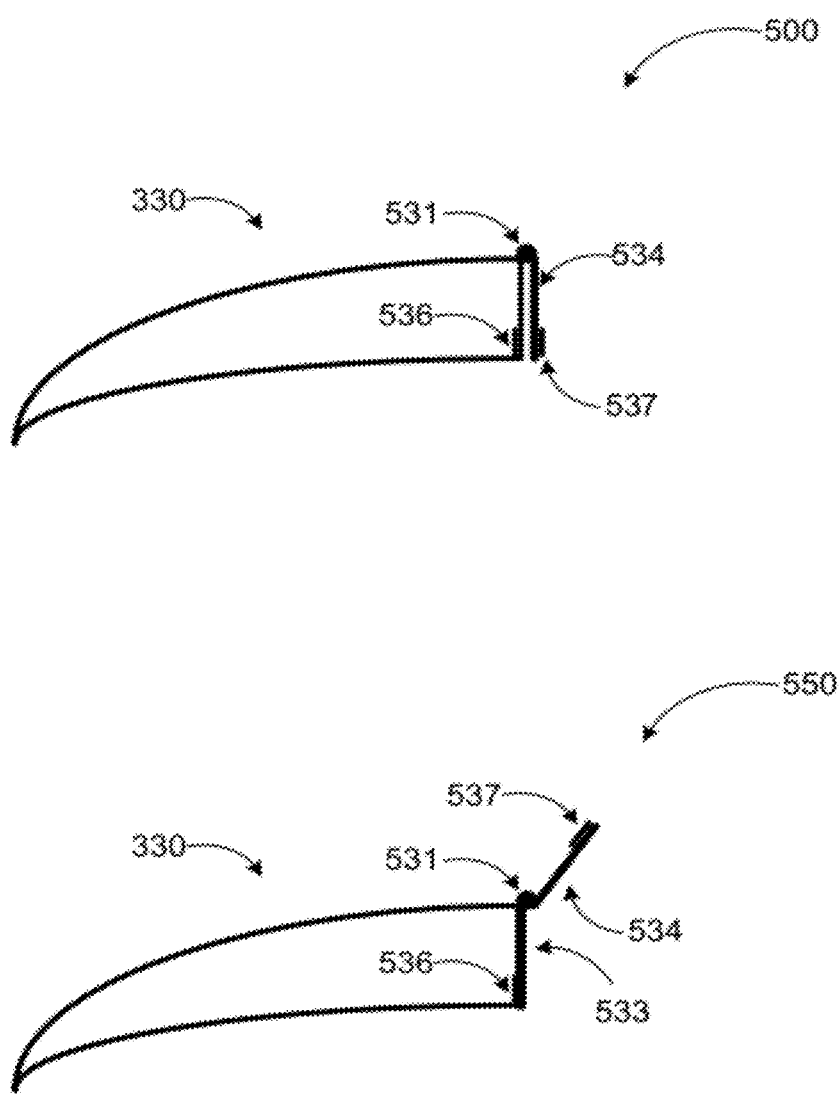
FIG. 5 illustrates side views of example AR eyeglasses utilizing the flip-up feature for detecting when AR eyeglasses are in use for power management purposes.

FIG. 5 illustrates side views of example AR eyeglasses utilizing the flip-up feature for detecting when AR eyeglasses are in use for power management purposes, arranged in accordance with at least some embodiments described herein. The flip-up feature may include the actual display(s) or may be a cover that indicates the AR eyeglasses are not in use when in a closed position (diagram 500).

As mentioned previously, hinges (e.g. 531) may be configured in conjunction with or in lieu of the sensors to detect if a wearer is wearing the AR eyeglasses 330. Arms of the AR eyeglasses 330 may be coupled to the frame of the AR eyeglasses 330 via hinges (e.g. 533), and when the arms of the AR eyeglasses 330 are folded, the closed position of the hinges may indicate a power off state; conversely, when the arms of the AR eyeglasses 330 are unfolded, the open position of the hinges (e.g. 533) may indicate a power on state.

According to another example, hinge 531 may be configured to detect an operational status based on whether the movable part 534 is flipped up or down (diagrams 500 and 550, respectively). If the movable part 534 is the actual display, the flipped down position may indicate a power on state and vice versa. If the movable part 534 is a cover, on the other hand, the reverse may be true (when the cover is flipped down, the power is turned off and when the cover is flipped up, the power is turned on). According to a further embodiment, sensor pair 536, 537 may be configured to determine whether movable part 534 is flipped up or down. For example, if the sensor pair 536, 537 are touching each other or close to each other, a flipped down position may be determined. Otherwise, the movable part 534 may be determined to be in a flipped up position. Sensor pair 536, 537 may be capacitive sensors, magnetic sensors, optical sensors, or even conductive patches that close an electrical circuit when they are in contact.

Figure 6:
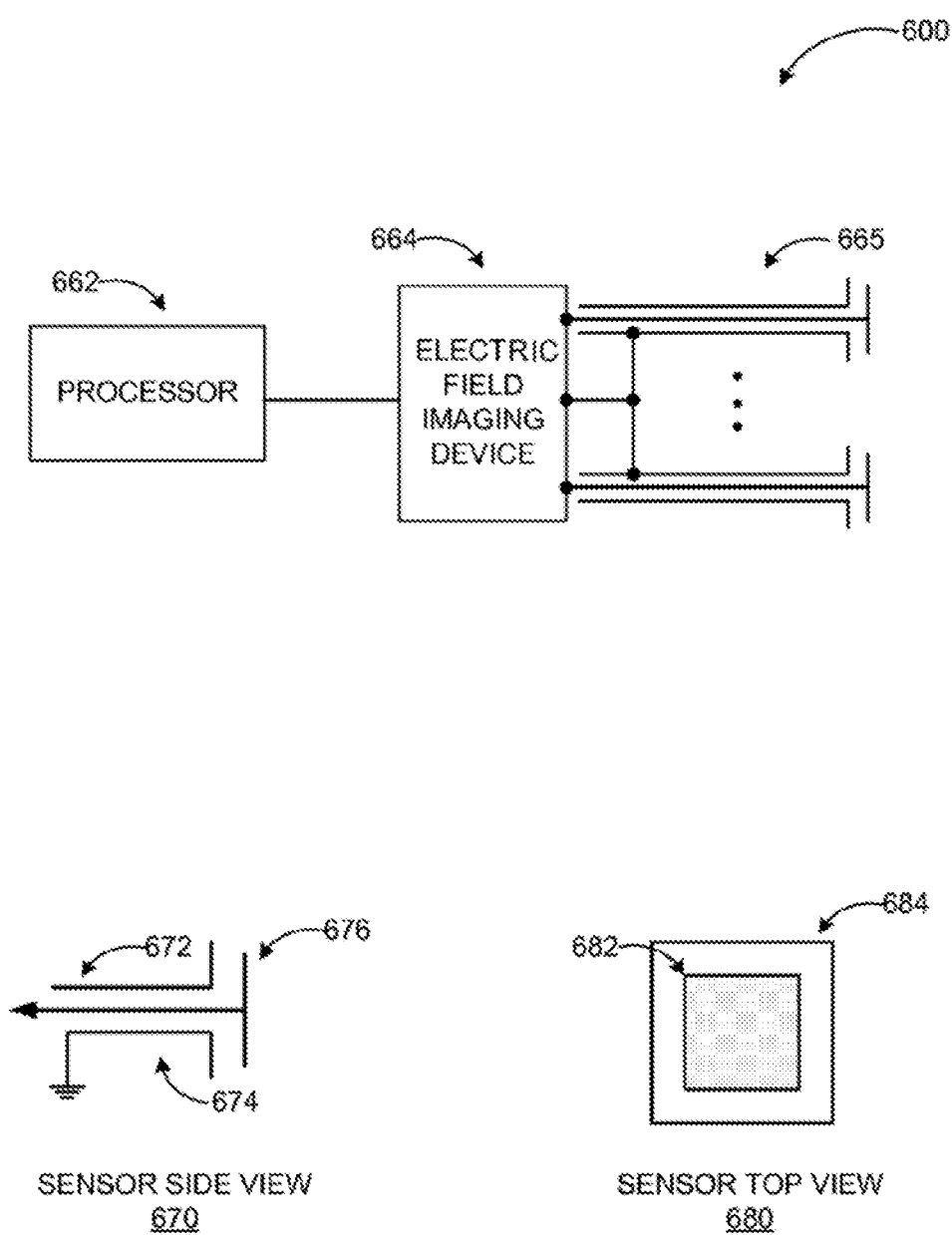
FIG. 6 illustrates AR eyeglass use detection through an electric field imaging device.

FIG. 6 illustrates AR eyeglass use detection through an electric field imaging device arranged in accordance with at least some embodiments. Diagram 600 shows one example configuration and two sensor views with a shield implementation.

The sensors of AR eyeglasses arranged according to some embodiments may be fitted with an 'active' shield (e.g., sensors 665). The shield may be configured to reduce any sensitivity of the system to nearby grounds or other stray electromagnetic fields. The sensor (which may have a pad such as pad 676 in sensor side view 670 or sensor pad 682 in sensor top view 680) may have an over-sized shield behind it (e.g., sensor top view 680). For head orientation measurements, the head may have a larger capacitance than the shoulder, but the head capacitance may be relatively fixed. For example, the system may measure capacitance ("C") in the following manner: C_total=C_shoulder+C_head, where C_head is large but relatively fixed and C_shoulder is smaller than the head capacitance but variable as head to shoulder orientation is changed. If four sensors are used, each producing samples at, for example, approximately 50 Hz, there may be two sensors on the left eyeglass frame and two on right frame (as shown in diagram 200 of FIG. 2). This may result in the samples: M1, M2, M3, and M4 (M1 and M2 on the right arm, M3 and M4 on the left arm, respectively). Then, filtered time averages of each measurement may be constructed, and they may be called <M1>, <M2>, <M3>, <M4>. For a person looking left, the capacitance to ground signals on the left (depending on the exact position of the sensors relative to the head) may both decrease and the capacitance to ground on the right may both increase. As a result, filtered signals may be expressed as:

$$\frac{M1 - \langle M1 \rangle}{\langle M1 \rangle} + \frac{M3 - \langle M3 \rangle}{\langle M3 \rangle} = A, \text{ and} \qquad [1]$$

$$\frac{M2 - \langle M2 \rangle}{\langle M2 \rangle} + \frac{M4 - \langle M4 \rangle}{\langle M4 \rangle} = B. \qquad [2]$$

To detect leftward motion of the head, a short time average of <A> may be negative and <B> may be positive. To detect rightward motion of the head, a short time average of <A> may be positive and <B> may be negative. Similar combinations of sensors may be used to detect nod down, nod up, tilt left and tilt right. Selecting appropriate time constants, active shield pad sizes and positions to reduce the fixed capacitance of the head and reducing the noise in the system may be apparent to those skilled in the art.

Thus, a sensor according to embodiments may be electrically represented as shown in sensor side view 670 with sensor pad 676, one side of the active shield 672 being coupled to a detection device such as electric field imaging device 664, and the other side of the active shield 674 being coupled to ground. Electric field imaging device 664 may be coupled to processor 662 for processing sensor signals in order to determine user movements or inputs through the sensors.

According to another example, a sensor implemented on AR eyeglasses may have shielding (e.g. shielding 684 in sensor top view 680) on the back side of the sensor pad 682 such that when the AR glasses are closed, the system is not confused about whether the AR glasses should be powered up or down. In other words, when the AR glasses are closed (i.e. the arms of the glasses are folded), one or more sensors on the right arm of the AR glasses may overlap with one or more sensors on the left arm of the AR glasses. This may produce a result where left arm sensors are sensing the capacitance of right arm sensors, and thereby potentially giving false positive results (indicating that the AR glasses are being worn by wearers, when in fact they are not worn and, in fact, are intended to be off, by having arms of the glasses folded). The aforementioned shielding, such as electrical shielding, on the back side of sensors may reduce or eliminate this phenomenon.

In AR eyeglasses with a flip-up feature as described previously, the sensors may also be placed on the forehead of the wearer, in which case the sensors on the nose pads of the AR glasses may determine a change in capacitance. For frame mounted capacitive sensors, there may be a reduction in measured capacitance of the body to ground based on a length of the air gap between the frame mounted sensors and the head. Behind ear sensors may be relatively easier to implement requiring less sensitive capacitance measurement compared to other locations such as the bridge of the AR eyeglasses or in a front portion of the arms.

The presence of a head may be detected in the AR eyeglasses via capacitance changes through a number of ways. For example, a sensitive circuit with a small parallel plate near the head may be capacitively coupled to ground, and a property of the circuit (e.g., an RMS voltage in a capacitive voltage divider with the head sensor) may be measured. In another example implementation, charge transfer between sensor plates may be measured. In yet another example implementation, a change in capacitance of two plates with an unknown dielectric between them (e.g., mainly water filled human body/head) may be used. Of course, these methods may also be used in combination with each other or in combination with additional methods known in the art.

Figure 7:
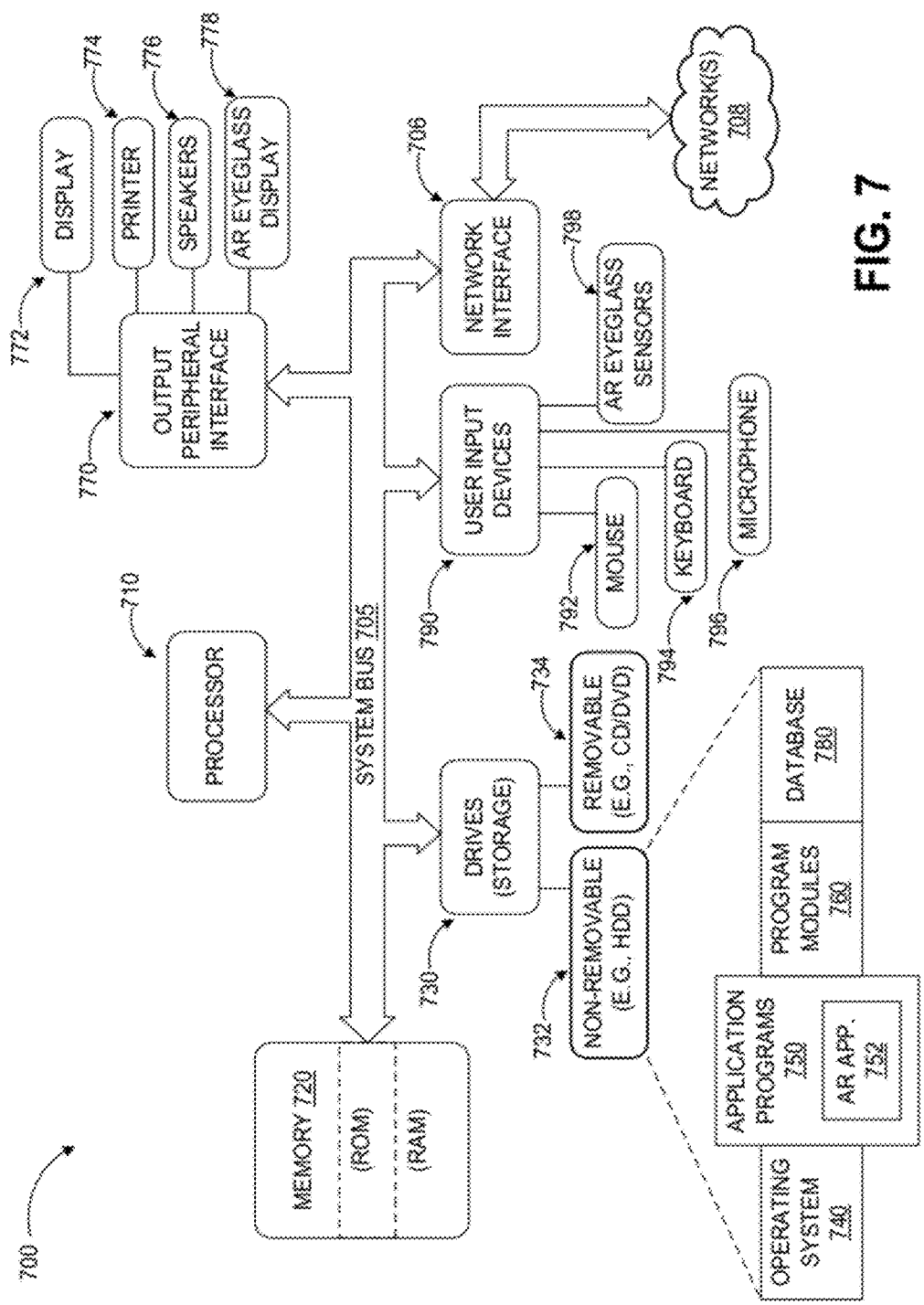
FIG. 7 illustrates a general purpose computing device, which may be used to implement proximity sensing mechanisms in AR eyeglasses.

While embodiments have been discussed above using specific examples, components, detection methods, and configurations, they are intended to provide a general guideline to be used for wearable AR displays employing proximity sensors. These examples do not constitute a limitation on the embodiments, which may be implemented using other components, modules, detection methods, and configurations using the principles described herein. For example, different types of sensors may be used to determine when the eyeglasses are being worn, to detect user input, and to determine when the eyeglasses are taken off FIG. 7 illustrates a general purpose computing device, which may be used to implement proximity sensing mechanisms in AR eyeglasses, arranged according to at least some embodiments of the present disclosure.

Computer 700 includes a processor 710, memory 720, and one or more drives 730. The drives 730 and their associated computer storage media such as removable storage media 734 (e.g., CD-ROM, DVD-ROM) and non-removable storage media 732 (e.g. a hard drive disk), may provide storage of computer readable instructions, data structures, program modules and other data for the computer 700. Drives 730 may include an operating system 740, application programs 750, program modules 760, and database 780. Computer 700 further may include user input devices 790 through which a user may enter commands and data. Input devices 790 may include an electronic digitizer, a microphone 796, a keyboard 794, and a pointing device such as a mouse device 792, trackball device or touch pad device. Other input devices may include a joystick device, game pad device, satellite dish, scanner device, or the like.

One of the user input devices for computer 700, according to some embodiments, may be AR eyeglass sensors 798. When computer 700 is executing an AR application 752 under application programs 750, AR eyeglass sensors 798 may provide user interface elements to the user and feedback to computer 700 regarding user actions associated with the provided user interface elements. For example, AR eyeglass sensors may detect user indications regarding volume control, display controls, user's viewing direction, user's acceptance/rejection of a decision, and comparable actions.

These and other input devices may be coupled to processor 710 through a user input interface that is coupled to a system bus 705, but may be coupled by other interface and bus structures, such as a parallel port, game port or a universal serial bus (USB). Computers such as computer 700 may also include other peripheral output devices such as speakers 776, printer 774, display 772, and AR eyeglass display 778, which may be coupled through an output peripheral interface 770 or the like.

Memory 720, removable storage devices 734 and non-removable storage devices 732 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computer 700. Any such computer storage media may be part of computer 700.

Computer 700 may operate in a networked environment using logical connections to one or more computers, such as a remote computer connected to network interface 706. The remote computer may be a personal computer, a server, a router, a network PC, a peer device or other common network node, and can include many or all of the elements described above relative to computer 700. Networking environments are commonplace in offices, enterprise-wide area networks (WAN), local area networks (LAN), intranets and world-wide networks such as the Internet. For example, in the subject matter of the present application, computer 700 may comprise the source machine from which data is being migrated, and the remote computer may comprise the destination machine or vice versa. It should be noted, however, that source and destination machines need not be coupled together by a network(s) 708 or any other means, but instead, data may be migrated via any media capable of being written by the source platform and read by the destination platform or platforms. When used in a LAN or WLAN networking environment, computer 700 may be coupled to the LAN through network interface 706 or an adapter.

The network(s) may comprise any topology employing servers, clients, switches, routers, modems, Internet service providers (ISPs), and any appropriate communication media (e.g., wired or wireless communications). A system according to some embodiments may have a static or dynamic network topology. The network(s) may include a secure network such as an enterprise network (e.g., a LAN, WAN, or WLAN), an unsecure network such as a wireless open network (e.g., IEEE 802.11 wireless networks), or a worldwide network such as (e.g., the Internet). The network(s) may also comprise a plurality of distinct networks that are adapted to operate together. The network(s) are adapted to provide communication between the nodes described herein. By way of example, and not limitation, the network(s) may include wireless media such as acoustic, RF, infrared and other wireless media.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computer 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computer 700 may also be implemented as a personal computer including both laptop computer and non-laptop computer configurations. Moreover, computer 700 may be implemented as a networked system or as part of a general purpose or specialized server.

Figure 8:
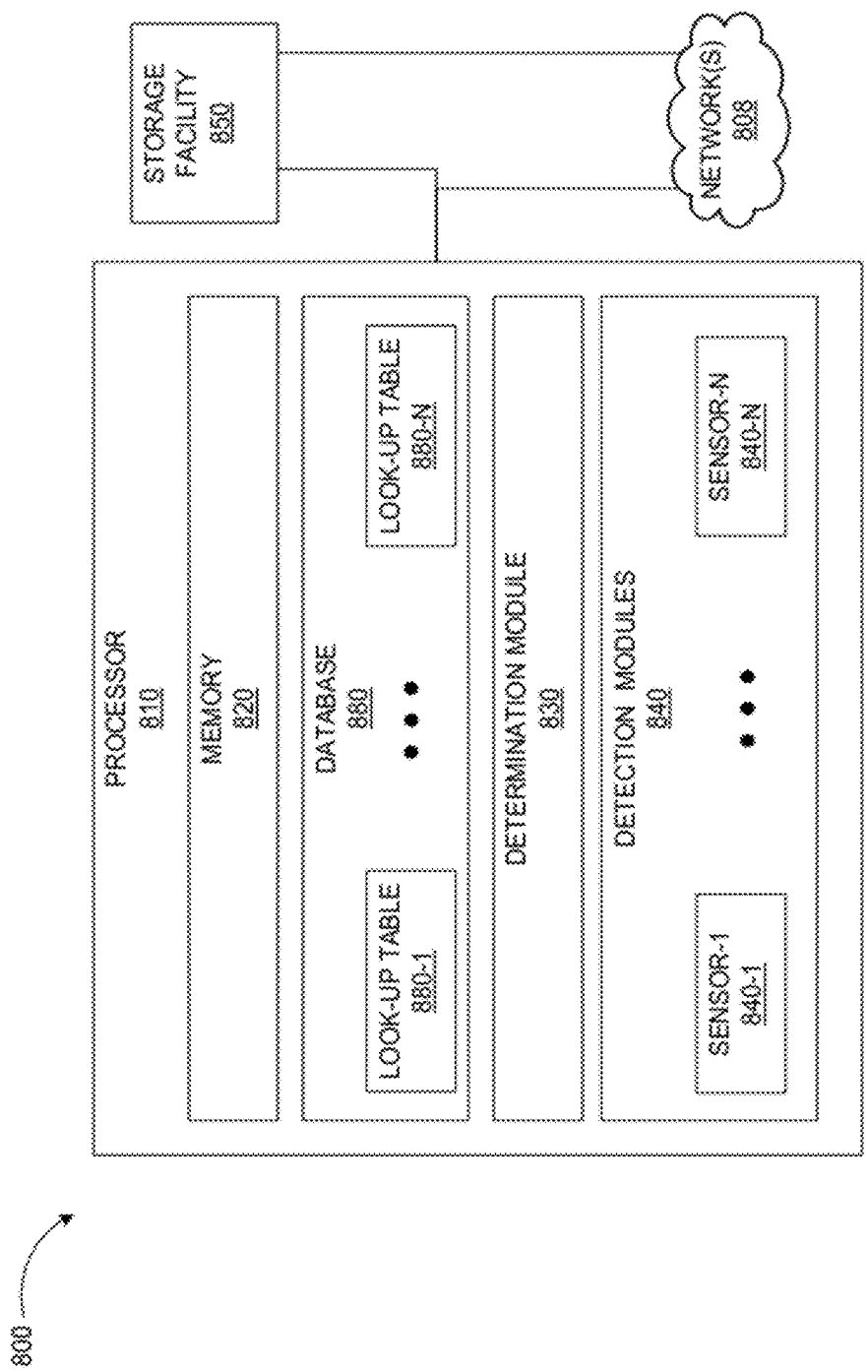
FIG. 8 illustrates a special purpose processor, which may be used to implement proximity sensing mechanisms in AR eyeglasses.

FIG. 8 illustrates a special purpose processor, which may be used to implement proximity sensing mechanisms in AR eyeglasses, arranged according to at least some embodiments of the present disclosure. Processor 810 in diagram 800 may be part of a computing device that is communicatively coupled to AR eyeglasses (e.g. AR eyeglasses 330) or may be embedded into the AR eyeglasses.

Processor 810 may include a number of detection modules 840. Each detection module may be associated with a sensor (e.g., sensors 840-1 through 840-N). Detection modules 840 may be configured to detect a sensor output such as a voltage measurement indicating a sensor's detection of a wearer's head, nose, the eyeglasses being folded or opened, and the like. Detection modules 840 may be configured to provide an output indicating sensor detection(s) to a determination module 830. Determination module 830 may be configured to render a decision based on monitored parameter and associated sensor information. For example, the monitored parameter may be whether the AR eyeglasses are being worn based on detection of the head or nose of the wearer, the arms of the eyeglasses being folded open, or a flip-up feature position.

Database 880 may be configured to store data associated with the monitored parameter to assist the determination module 830 render a decision. For example, database 880 may include look-up tables 880-1 through 880-N listing expected voltage measurement values from sensors 840-1 through 840-N and corresponding parameter values (e.g., eyeglasses in use or not). Upon comparing detection module outputs to the look-up tables, determination module 830 may be configured to determine that the eyeglasses should be powered up and enable processor 810 to activate a power supply module for the eyeglasses.

According to other embodiments, other parameters such as operational controls of the AR eyeglasses may be monitored and controlled based on inputs from sensors 840-1 through 840-N. Each sensor may be associated with one detection module. Alternatively, multiple sensors may be monitored by a single detection module. Moreover, multiple determination modules may be employed for different functionalities. Memory 820 may be configured to store instructions for determination module 830 and/or detection modules 840, which may be implemented as hardware, software, or combination of hardware and software. Processor 810 may communicate through direct electrical coupling or through networked communications (e.g., network(s) 808) with other computing devices and/or data stores such as storage facility 850.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 9:
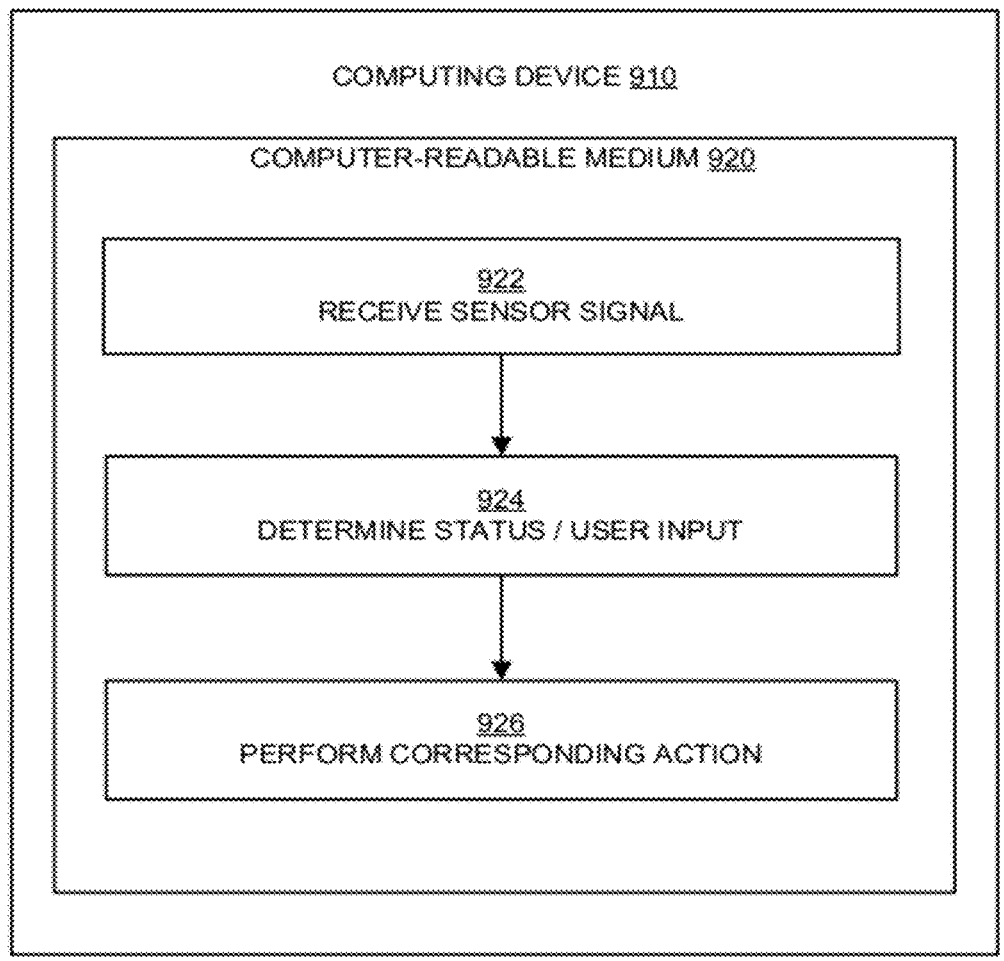
FIG. 9 is a flow diagram illustrating an example method that may be performed by a computing device, such as computer 700 in FIG. 7 or special purpose processor 810 in FIG. 8.

FIG. 9 is a flow diagram illustrating an example method that may be performed by a computing device 910, such as computer 700 in FIG. 7 or special purpose processor 810 in FIG. 8, arranged in accordance with at least some embodiments described herein. The operations described in blocks 922, 924 and 926 may be stored as computer-executable instructions in a computer-readable medium 920 such as drives 730 of computer 700 or memory 820 of processor 810.

A process of employing proximity sensors in an augmented reality system may begin with operation 922, "RECEIVE SENSOR SIGNAL." At operation 922, a sensor output is received from one of a plurality of sensors on the AR eyeglasses such as sensors 222, 224, and 226 on AR eyeglasses 220 of FIG. 2. The sensors may be integrated into various strategic locations on the AR eyeglasses to detect eyeglass status (e.g., in operational state) or user input as described herein.

Operation 922 may be followed by operation 924, "DETERMINE STATUS/USER INPUT." At operation 924, the received signals may be processed to determine an eyeglass status or a user input. For example, the monitored status may be a position of the eyeglass arms. If the arms are open, an inference may be made that a user intends to use the AR eyeglasses and the eyeglasses may be powered up automatically. Similarly, the detection of the user's head between the arms of the eyeglasses (or the user's nose under the bridge of the eyeglasses) may indicate an intent to use the eyeglasses. The processing may include comparing a value of the received signal to expected values in a look-up table and determining the status. User input such as head movement or touching of at least one of the sensors may also generate a signal, which may be processed in a comparable manner. The received signal may be processed by a detection module such as detection modules 840 and processed by a processor like processor 810 of FIG. 8.

Operation 924 may be followed by operation 926, "PERFORM CORRESPONDING ACTION." At operation 926, processor 810 may instruct an operational module to perform an action corresponding to the received sensor input. For example, a power supply module may be instructed to power up the AR eyeglasses in response to detection of the head or open position of the eyeglasses. Similarly, user input through the sensors may be used to activate or control operational modules such as adjusting audio volume controls, display properties (e.g., brightness), etc.

The operations included in the above described process are for illustration purposes. Proximity sensor equipped AR eyeglasses may be implemented by similar processes with fewer or additional operations. In some examples, the operations may be performed in a different order. In some other examples, various operations may be eliminated. In still other examples, various operations may be divided into additional operations, or combined together into fewer operations.

Figure 10:
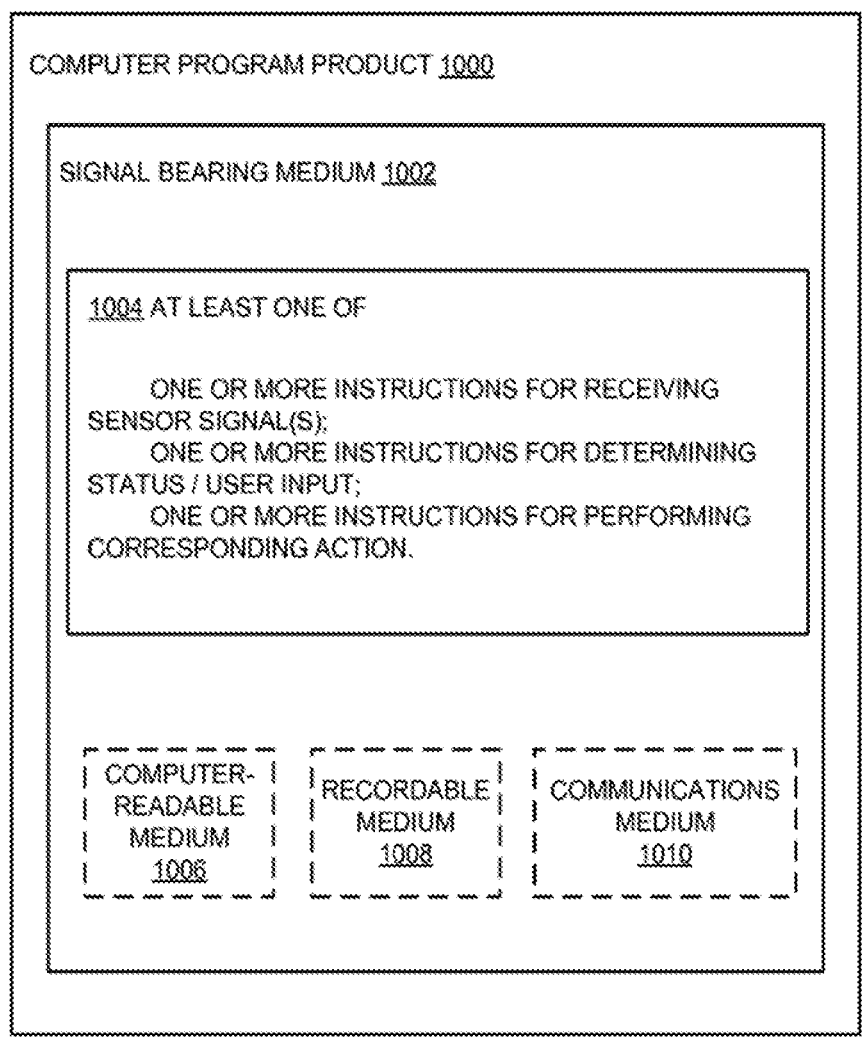
FIG. 10 illustrates a block diagram of an example computer program product, all arranged in accordance with at least some embodiments described herein.

FIG. 10 illustrates a block diagram of an example computer program product 1000 arranged in accordance with at least some embodiments described herein. In some examples, as shown in FIG. 10, computer program product 1000 may include a signal bearing medium 1002 that may also include machine readable instructions 1004 that, when executed by, for example, a processor, may provide the functionality described above with respect to FIG. 7 and FIG. 8. Thus, for example, referring to processor 810, the detection modules 840 and determination module 830 may undertake one or more of the tasks shown in FIG. 10 in response to instructions 1004 conveyed to processor 810 by signal bearing medium 1002 to perform actions associated with employing proximity sensors as described herein. Some of those instructions may include receiving sensor signals, determining status/user input, and/or performing corresponding actions.

In some implementations, signal bearing medium 1002 depicted in FIG. 10 may encompass a computer-readable medium 1006, such as, but not limited to, a hard disk drive (HDD), a Compact Disc (CD), a Digital Video Disk (DVD), a digital tape, memory, etc. In some implementations, signal bearing medium 1002 may encompass a recordable medium 1008, such as, but not limited to, memory, read/write (R/W) CDs, R/W DVDs, etc. In some implementations, signal bearing medium 1002 may encompass a communications medium 1010, such as, but not limited to, a digital and/or an analog communication medium (e.g., a fiber optic cable, a waveguide, a wired communications link, a wireless communication link, etc.). Thus, for example, computer program product 1000 may be conveyed to one or more modules of the processor 504 by an RF signal bearing medium 1002, where the signal bearing medium 1002 is conveyed by a wireless communications medium 1010 (e.g., a wireless communications medium conforming with the IEEE 802.11 standard).

In some examples, the present disclosure describes a system configured to adaptively power a wearable augmented reality (AR) 220 display based on proximity sensors, where the system includes a sensor 448 attached to the wearable AR display. The sensor is configured to generate a detection signal, wherein the detection signal indicates one or more of a presence of a wearer's head, a position of the wearer's head, and/or a status of the wearable AR display. The system also includes a processor 810 coupled to the sensor, where the processor is configured to determine whether the wearable AR display is to be powered up based on the detection signal from the sensor, and power up the wearable AR display when the wearable AR display is to be powered up.

The status of the wearable AR display 220 includes arms of the wearable AR display being in an open position or a closed position. The sensor 448 may be an inductive sensor, a magnetic sensor, a sonar sensor, an optical sensor, an Eddy-current sensor, a mechanical switch, or a thermal infrared sensor. The sensor 448 may also be a capacitance sensor configured to detect one or more of the presence of the wearer's head, the position of the wearer's head relative to the wearer's torso, and/or the status of the wearable AR display based on sensing a capacitance difference.

The system may further include a plurality of sensors 222, 224, 226 attached to one or more of a left arm, a right arm, a bridge, and/or a rim of the wearable AR display 220. The plurality of sensors 222, 224, 226 are configured to receive user input for controlling at least one operational parameter of the wearable AR display 220. The operational parameter of the wearable AR display 220 may include audio controls or display controls. The system may also include a movable part 334, 335 attached to a rim of the wearable AR display 220 through at least one hinge, where the flip-up movable part includes at least one additional sensor 337, 339. The movable part 334, 335 may be a display or a cover blocking a see-through component of the wearable AR display. The status of the wearable AR display 220 may include the movable part 334, 335 being in a flipped up position or a flipped down position. Moreover, the position of the movable part 334, 335 may be determined based on detection by the at least one hinge 331 or the at least one additional sensor 337, 339.

In further examples, the present disclosure describes a system configured to adaptively power a wearable augmented reality (AR) display 220 based on proximity sensors 222, 224, 226. The system includes a capacitive sensor 448 coupled to a reference node 444, where the sensor 448 is configured to measure a value difference in capacitance between a reference node 444 and an external node 445. The system also includes a voltage measuring device 446 coupled to the sensor 448. The voltage measuring device 446 is configured to receive the value difference as input, and is further configured to provide data output that is configured to make a determination when to provide power to the wearable AR display 220. The reference node 444 may be a reference capacitance and the external node 445 may be a person 218.

The system may further include a processor 810 coupled to the voltage measuring device. The processor is configured to receive the data output from the voltage measuring device 446, compare the data output to a plurality of stored values in a look-up table 880-1 to 880-N, and make the determination when to provide power to the wearable AR display 220. This may be accomplished by a signal dependent algorithm employing time averages, temporal filters, and comparable parameters. The processor 810 is further configured to transition the wearable AR display 220 into a low power mode in response to the comparison of the data output to the plurality of stored values. The sensor 448 may include an active shield 684 to reduce sensitivity to nearby grounds and stray electromagnetic fields. The sensor 448 may further be coated with a hydrophobic material to prevent interference of water and/or sweat with sensor measurements.

In yet further examples, the present disclosure describes a method for controlling operational aspects of a wearable augmented reality (AR) display 220 through proximity sensors 222, 224, 226. The method includes receiving a sense signal from at least one of a plurality of sensors attached to one or more of a left arm, a right arm, a bridge, and/or a rim of the wearable AR display (922); determining one or more of a presence of a wearer's head, a position of the wearer's head, a user input, and/or a status of the wearable AR display based on the received sense signal (924); and performing an action associated with an operational aspect of the wearable AR display in response to the determination (926).

The action associated with the operational aspect of the wearable AR display 220 includes one or more of powering up the AR display, powering down the AR display, transitioning the AR display into a low power mode, adjusting audio controls, and/or adjusting display controls. The method may also include receiving a plurality of sense signals from a plurality of sensors 222, 224, 226, where the plurality of sensors include one or more of a capacitive sensor, an inductive sensor, a magnetic sensor, a sonar sensor, an optical sensor, an Eddy-current sensor, or a thermal infrared sensor. The method may further include in response to detecting successive positions of the wearer's (218) head relative to the wearer's torso, inferring one or more of a negative user response based on detected left-right motion and an affirmative user response based on detected up-down motion.

In other examples, the present disclosure describes a computer-readable storage medium 1002 having instructions 1004 stored thereon for controlling operational aspects of a wearable augmented reality (AR) display 220 through proximity sensors 222, 224, 226. The instructions include sensing one or more of a presence of a wearer's head, a position of the wearer's head, a user input, and/or a status of the wearable AR display based on a received sense signal at a plurality of sensors 222, 224, 226 attached to the wearable AR display 220.

The instructions further include determining whether to power up or power down the wearable AR display based on one or more of the sensed presence of the wearer's head and/or the status of the wearable AR display; inferring a user response based on the sensed position of the wearer's head; and determining an action associated with an operational aspect of the wearable AR display in response to one of the inferred user response or sensed user input. These actions may be performed at a processor 810. The status of the wearable AR display 220 includes one or more of arms of the wearable AR display being in one of an open position or a closed position and/or a movable part 334, 335 of the wearable AR display being in one of a flipped up position or a flipped down position.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, materials, and configurations, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control modules (e.g., providing power to AR eyeglasses or adjusting various operational parameters of the AR eyeglasses).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system configured to adaptively power a wearable augmented reality (AR) display based on proximity sensors, the system comprising:
    a plurality of proximity sensors attached to one or more of a left arm, a right arm, a bridge, and a rim of the wearable AR display, wherein the proximity sensors are configured to generate a detection signal, wherein the detection signal indicates one or more of a position of a wearer's head, and a status of the wearable AR display; and
    a processor configured to:
        determine the position of the wearer's head based on the detection signal from the proximity sensors based on:
        construction of filtered time averages <M1>, <M2>, <M3>, <M4>, for capacitance measurements determined by at least one of the proximity sensors based on a capacitance associated with the wearer's head and a capacitance associated with the wearer's shoulder, wherein:
            at least four capacitance sensors are employed to determine the capacitance measurements such that at least four capacitance measurements, M1, M2, M3, and M4, are determined, and
            filtered signals based on the capacitance measurements and the filtered time averages are determined by formula:

$$\frac{M1 - \langle M1 \rangle}{\langle M1 \rangle} + \frac{M3 - \langle M3 \rangle}{\langle M3 \rangle} = A, \text{ and } \frac{M2 - \langle M2 \rangle}{\langle M2 \rangle} + \frac{M4 - \langle M4 \rangle}{\langle M4 \rangle} = B,$$

wherein the capacitance measurements M1 and M2 are based on sensors on the wearer's right arm and the capacitance measurements M3 and M4 are based on sensors on the wearer's left arm, respectively;
        determine a motion of the wearer's head, wherein a negative value of a short time average <A> of a filtered signal A and a positive value of a short time average <B> of a filtered signal B indicate a leftward motion of the wearer's head, and a positive value of the short time average <A> of the filtered signal A and a negative value of the short time average <B> of the filtered signal B indicate a rightward motion of the wearer's head; and
        determine whether the wearable AR display is to be powered up based on the detection signal from the proximity sensors, and power up the wearable AR display when the wearable AR display is to be powered up.

2. The system according to claim 1, wherein the proximity sensors include one or more of an inductive sensor, a magnetic sensor, a sonar sensor, an optical sensor, an Eddy-current sensor, a mechanical switch, or a thermal infrared sensor.

3. The system according to claim 1, wherein the at least one of the proximity sensors includes a capacitance sensor configured to allow for determination of the capacitance measurements.

4. The system according to claim 1, wherein the plurality of the proximity sensors are configured to receive user input to control at least one operational parameter of the wearable AR display.

5. The system according to claim 1, further comprising:
    a movable part attached to the rim of the wearable AR display through at least one hinge, wherein the movable part includes at least one additional sensor.

6. The system according to claim 5, wherein the movable part includes one of a display or a cover that blocks a see-through component of the wearable AR display.

7. The system according to claim 5, wherein the status of the wearable AR display includes the movable part being in one of a flipped up position and a flipped down position.

8. The system according to claim 7, wherein the position of the movable part is determined based on detection by one of the at least one hinge and the at least one additional sensor.

9. A system configured to adaptively power a wearable augmented reality (AR) display based on proximity sensors, the system comprising:
    a plurality of proximity sensors attached to one or more of a left arm, a right arm, a bridge, and a rim of the wearable AR display;
    at least one of the proximity sensors includes a capacitance sensor that is coupled to a reference node, wherein the capacitance sensor is configured to measure a value difference in capacitance between the reference node and an external node, and wherein the at least one of the proximity sensors is configured to determine capacitance measurements based on a capacitance associated with a wearer's head and a capacitance associated with the wearer's shoulder; and
    a voltage measurement device coupled to the capacitance sensor, wherein the voltage measurement device is configured to receive the value difference and the capacitance measurements as input, and is further configured to provide data output that allows for a determination as to when to provide power to the wearable AR display, the data output including at least a position of the wearer's head determined by:
        construction of filtered time averages <M1>, <M2>, <M3>, <M4>, for the capacitance measurements determined by the at least one of the proximity sensors, wherein:
            at least four capacitance sensors are employed to determine the capacitance measurements such that at least four capacitance measurements, M1, M2, M3, and M4, are determined, and
            filtered signals based on the capacitance measurements and the filtered time averages are determined by formula:

$$\frac{M1 - \langle M1 \rangle}{\langle M1 \rangle} + \frac{M3 - \langle M3 \rangle}{\langle M3 \rangle} = A, \text{ and } \frac{M2 - \langle M2 \rangle}{\langle M2 \rangle} + \frac{M4 - \langle M4 \rangle}{\langle M4 \rangle} = B,$$

wherein the capacitance measurements M1 and M2 are based on sensors on the wearer's right arm and the capacitance measurements M3 and M4 are based on sensors on the wearer's left arm, respectively, and determination of a motion of the wearer's head wherein a negative value of a short time average <A> of a filtered signal A and a positive value of a short time average <B> of a tittered signal B indicate a leftward motion of the wearer's head, and a positive value of the short time average <A> of the filtered signal A and a negative value of the short time average <B> of the filtered signal B indicate a rightward motion of the wearer's head.

10. The system according to claim 9, wherein the reference node includes a reference capacitance.

11. The system according to claim 9 wherein the external node includes a person.

12. The system according to claim 9, further comprising:
a processor coupled to the voltage measurement device, wherein the processor is configured to receive the data output from the voltage measurement device, compare the data output to a plurality of stored values in a look-up table, and make the determination when to provide power to the wearable AR display.

13. The system according to claim 12, wherein the processor is further configured to transition the wearable AR display into a low power mode in response to the comparison of the data output to the plurality of stored values.

14. A method to control operational aspects of a wearable augmented reality (AR) display through proximity sensors, the method comprising:
receiving a sense signal from at least one of a plurality of proximity sensors attached to one or more of a left arm, a right arm, a bridge, and a rim of the wearable AR display, wherein the at least one of the plurality of proximity sensors includes a capacitance sensor configured to measure a value difference in capacitance between a reference capacitance and a wearer of the wearable AR display to determine a value of the received sense signal, and wherein the at least one of the plurality of proximity sensors is configured to determine capacitance measurements based on a capacitance associated with the wearer's head and a capacitance associated with the wearer's shoulder, the capacitance sensor powered by an oscillator through the reference capacitance;
determining one or more of a position of the wearer's head, a user input, and a status of the wearable AR display based on at least one of the received sense signal and the capacitance measurements, wherein the value of the received sense signal is compared to expected values in a look-up table to determine the user input and the status of the wearable AR display, and wherein the position of the wearer's head is determined based on the capacitance measurements by constructing filtered time averages <M1>, <M2>,<M3>, <M4>, for the capacitance measurements determined by the at least one of the plurality of proximity sensors, wherein:
at least four capacitance sensors are employed to determine the capacitance measurements such that at least four capacitance measurements, M1, M2, M3, and M4, are determined, and
filtered signals based on the capacitance measurements and the filtered time averages are determined by formula:

$$\frac{M1-\langle M1 \rangle}{\langle M1 \rangle} + \frac{M3-\langle M3 \rangle}{\langle M3 \rangle} = A, \text{ and } \frac{M2-\langle M2 \rangle}{\langle M2 \rangle} + \frac{M4-\langle M4 \rangle}{\langle M4 \rangle} = B,$$

wherein the capacitance measurements M1 and M2 are based on sensors on the wearer's right aim and the capacitance measurements M3 and M4 are based on sensors on the wearer's left arm, respectively;
determining a motion of the wearer's head, wherein a negative value of a short time average <A> of a filtered signal A and a positive value of a short time average <B> of a filtered signal B indicate a leftward motion of the wearer's head, and a positive value of the short time average <A> of the filtered signal A and a negative value of the short time average <B> of the filtered signal B indicate a rightward motion of the wearer's head; and
performing an action associated with an operational aspect of the wearable AR display in response to the determination of the one or more of the position of the wearer's head, the user input, and the status of the wearable AR display.

15. The method according to claim 14, wherein the action associated with the operational aspect of the wearable AR display includes one or more of powering up the wearable AR display, powering down the wearable AR display, transitioning the wearable AR display into a low power mode, adjusting audio controls, and adjusting display controls.

16. A computer-readable memory device having instructions stored thereon to control operational aspects of a wearable augmented reality (AR) display through sensors, the instructions being executable to perform operations comprising:
at a plurality of proximity sensors attached to one or more of a left arm, a right arm, a bridge, and a rim of the wearable AR display, wherein at least one of the plurality of proximity sensors includes a capacitance sensor, to sense one or more of a position of a wearer's head, a user input, and a status of the wearable AR display based on a received sense signal;
at a processor, determine whether to power up or power down the wearable AR display based on the status of the wearable AR display, wherein the status is determined by comparison of a value of the received sense signal to expected values in a look-up table, the value of the received sense signal determined by the capacitance sensor by measurement of a value difference in capacitance between a reference capacitance and the wearer;
at the processor, determine the position of the wearer's head based on capacitance measurements determined by the at least one of the plurality of proximity sensors that includes the capacitance sensor based on a capacitance associated with the wearer's head and a capacitance associated with the wearer's shoulder by:
construction of filtered time averages <M1>, <M2>, <M3>, <M4>, for the capacitance measurements determined by the at least one of the plurality of proximity sensors, wherein:
at least four capacitance sensors are employed to determine the capacitance measurements such that at least four capacitance measurements, M1, M2, M3, and M4, are determined, and
filtered signals based on the capacitance measurements and the filtered time averages are determined by formula:

$$\frac{M1-\langle M1 \rangle}{\langle M1 \rangle} + \frac{M3-\langle M3 \rangle}{\langle M3 \rangle} = A, \text{ and } \frac{M2-\langle M2 \rangle}{\langle M2 \rangle} + \frac{M4-\langle M4 \rangle}{\langle M4 \rangle} = B,$$

wherein the capacitance measurements M1 and M2 are based on sensors on the wearer's right arm and the capacitance measurements M3 and M4 are based on sensors on the wearer's left arm, respectively;

at the processor, determine a motion of the wearer's head, wherein a negative value of a short time average <A> of a filtered signal A and a positive value of a short time average <B> of a filtered signal B indicate a leftward motion of the wearer's head, and a positive value of the short time average <A> of the filtered signal A and a negative value of the short time average <B> of the filtered signal B indicate a rightward motion of the wearer's head;

at the processor, infer a user response based on the position of the wearer's head; and at the processor, determine an action associated with an operational aspect of the wearable AR display in response to one of the inferred user response or sensed user input.

17. The computer-readable memory device of claim 16, wherein the status of the wearable AR display includes one or more of arms of the wearable AR display being in one of an open position or a closed position and a movable part of the wearable AR display being in one of a flipped up position or a flipped down position.

18. The system according to claim 1, wherein the capacitance measurement, C_total, is determined by formula, C_shoulder+C_head, wherein C_shoulder includes the capacitance associated with the wearer's shoulder and C_head includes the capacitance associated with the wearer's head.

* * * * *

UNITED STATES PATENT AND TRADEMARK OFFICE
CERTIFICATE OF CORRECTION

PATENT NO. : 9,606,612 B2
APPLICATION NO. : 13/148167
DATED : March 28, 2017
INVENTOR(S) : Milford It is certified that error appears in the above-identified patent and that said Letters Patent is hereby corrected as shown below:

In the Specification

In Column 1, Lines 7-8, delete "35 U.S.C §371" and insert -- 35 U.S.C. § 371 --, therefor.

In Column 3, Line 20, delete "hereof In" and insert -- hereof. In --, therefor.

In Column 10, Line 4, delete "taken off" and insert -- taken off. --, therefor.

In Column 16, Line 23, delete "thereof In" and insert -- thereof. In --, therefor.

In Column 18, Lines 55-56, delete "thereof Any" and insert -- thereof. Any --, therefor.

In the Claims

In Column 21, Line 1, in Claim 9, delete "head wherein" and insert -- head, wherein --, therefor.

In Column 21, Line 4, in Claim 9, delete "tittered signal" and insert -- filtered signal --, therefor.

In Column 21, Line 12, in Claim 11, delete "9 wherein" and insert -- 9, wherein --, therefor.

In Column 22, Line 2, in Claim 14, delete "right aim" and insert -- right arm --, therefor.

Signed and Sealed this
First Day of August, 2017

Joseph Matal
*Performing the Functions and Duties of the*
*Under Secretary of Commerce for Intellectual Property and*
*Director of the United States Patent and Trademark Office*